US006647923B2

(12) United States Patent
Nicoud et al.

(10) Patent No.: US 6,647,923 B2
(45) Date of Patent: Nov. 18, 2003

(54) DEVICE FOR COLLECTING ANIMAL FAECES

(76) Inventors: Heidi Béatrice Nicoud, Domaine les Diochets, Les Roussets, F-01560 Curciat-Dongalon (FR); Joél Nicoud, Domaine les Diochets, Les Roussets, F-01560 Curciat-Dongalon (FR)

( * ) Notice: Subject to any disclaimer, the term of this patent is extended or adjusted under 35 U.S.C. 154(b) by 0 days.

(21) Appl. No.: 10/168,532

(22) PCT Filed: Dec. 18, 2000

(86) PCT No.: PCT/FR00/03581

§ 371 (c)(1), (2), (4) Date: Sep. 25, 2002

(87) PCT Pub. No.: WO01/49588

PCT Pub. Date: Jul. 12, 2001

(65) Prior Publication Data

US 2003/0101943 A1 Jun. 5, 2003

(30) Foreign Application Priority Data

Dec. 30, 1999 (FR) ........................................... 99 16836

(51) Int. Cl.[7] ............................................... A01K 29/60
(52) U.S. Cl. ....................................... 119/161; 119/165
(58) Field of Search ................................ 119/161, 165, 119/867, 170; 220/495.06, 908.1, 908.2, 909, 495.08

(56) References Cited

U.S. PATENT DOCUMENTS 3,995,543 A * 12/1976 Montalbano ................ 100/343
4,319,694 A * 3/1982 Nehrbass et al. ...... 220/495.07
5,097,750 A * 3/1992 Oldham et al. ............... 454/63
5,108,004 A * 4/1992 Baldwin ..................... 220/522
5,134,974 A * 8/1992 Houser ....................... 119/168
5,337,581 A * 8/1994 Lott ............................ 62/264
5,678,723 A * 10/1997 Swift et al. ............ 220/495.07
5,799,909 A * 9/1998 Ziegler ....................... 248/101
6,082,574 A * 7/2000 Johnson ................... 220/495.1
D431,888 S * 10/2000 Roudebush .................. D32/53
6,283,321 B1 * 9/2001 Meshorer ............... 220/495.07
6,378,720 B1 * 4/2002 Santa Cruz et al. .... 220/495.06
2001/0052522 A1 * 12/2001 Forest ................... 220/495.07
2003/0010415 A1 * 1/2003 Szuszkiewicz .............. 150/154

FOREIGN PATENT DOCUMENTS

| | | |
|---|---|---|
| DE | 41 40 769 C | 6/1993 |
| DE | 2 729 375 A | 7/1996 |
| DE | 297 04 738 U | 7/1998 |
| DE | 299 05 244 U | 9/1999 |
| EP | 0 082 118 A | 6/1983 |
| FR | 1 587 486 A | 3/1970 |

* cited by examiner

*Primary Examiner*—Yvonne Abbott
(74) *Attorney, Agent, or Firm*—Arent Fox Kintner Plotkin & Kahn PLLC

(57) ABSTRACT

The invention relates to an animal waste collection device. The device claimed for the invention comprises a casing provided with side collection bag removal openings, at least one movable equipped side door or wall, at least one access opening which is made in such removable side door or wall or any other surface which is not a lower surface and which permits introduction of used individual collection bags into the interior of such casing. The interior of the casing holds a moving carriage which may be pulled toward the exterior by sliding motion and which carries a gathering bag for individual collection bags.

15 Claims, 5 Drawing Sheets

FIG. 4a
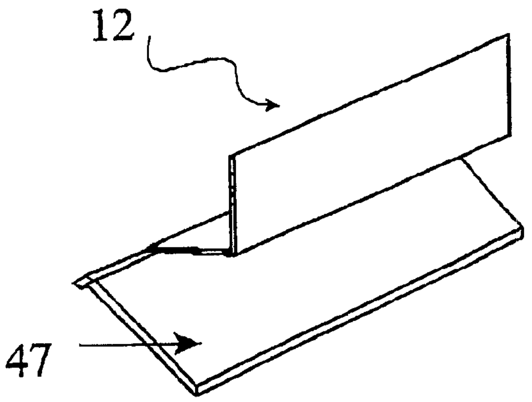
FIG. 4b
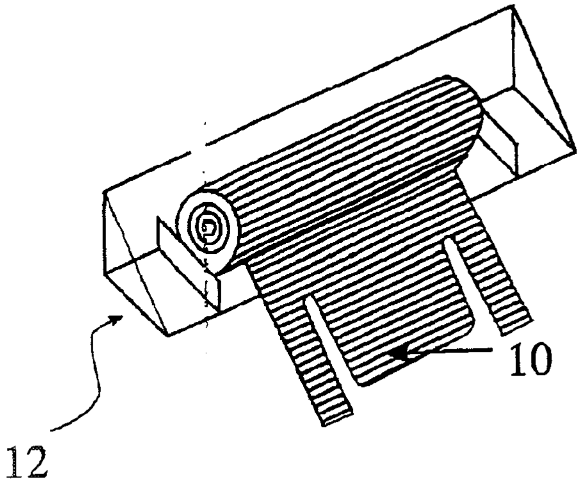
FIG. 4

DEVICE FOR COLLECTING ANIMAL FAECES

This invention relates to the waste collection area and more specifically to that of devices for collection of animal waste, canine waste in particular.

The device claimed for the invention comprises a casing provided with side openings or slots for removal of bags, a side door or opening provided with an access opening made in such side door or opening and permitting introduction of used collection bags into a gathering bag which is situated inside the casing. The interior of the casing comprises a moving carriage which may be pulled by sliding to the exterior of the casing and which carries a waste gathering bag.

The number of pets has been growing constantly for years. This growing pet population, that of dogs in particular, which is concentrated especially in urban areas, invariably creates problems.

In effect, owing to the lack of suitable means, dog owners for the sake of convenience allow their dogs to defecate on public property, sidewalks, in public gardens, in public parks, in sandboxes reserved for children, and so forth. This behavior creates olfactory pollution problems, problems of hygiene, as well as problems associated with the risk of slip and fall. The problem of canine waste is an especially acute one in an urban environment because of a high concentration of waste. Such pollution is being less and less tolerated in urban areas, and above all by people who do not own a pet. In addition, the budgets allocated by towns and cities for cleaning are growing constantly and becoming intolerable.

Attempts have been made to solve these problems, but they do not appear to have met with real success. In fact, canine waste collection devices have been proposed since the beginning of the 1980s; one such device, for example, is disclosed in patent document EP 0082118.

This document describes a waste receptacle comprising a container on which a gathering bag is fastened. This bag is held by a cover by clamping of the bag between the cover and the container, which serves as receptacle. The cover has an opening in front for introduction of waste as well as side openings or slots for dispensing of individual canine waste collection bags, the bags being stored in containers mounted inside the cover.

In the case of a device of this type, while the device makes means available permitting collection of waste, it does not concern itself with the way in which the receptacle is to be emptied. In effect, because of its design, this type of device compels the worker assigned the task of emptying the container to raise the cover, something which may present problems, especially in winter when it may be frozen and covered with ice and so very difficult to raise because of its adhesion to this part of the collection receptacle container.

Another disadvantage of a device of this kind lies in grasping the bag itself for its removal from the container. In effect, in order to remove the bag from the container the worker is forced to remove the latter by lifting it vertically out of the container.

An additional disadvantage of a device of this kind is that the worker who intends to empty the collection vessel is obliged to lean over the bag in order to pull it out of the receptacle is then greatly disturbed by the odors which are released from it.

This manner of proceeding is highly impractical, especially since in view of the nature of the wastes, canine dejecta, the weight of the collection bags may reach 20 kilograms. A weight such as this is very difficult to handle and forces the worker to exert effort which is concentrated in his back. Repetition of such handling a large number of times during the work shift is onerous for the worker, who is subject to ailments at the level of the back which are related to his work. It appears that it is because of these disadvantages that devices of this type have not met with success.

The object of this invention is to remedy such disadvantages by making available a device which is practical in use. The invention will be better understood by reference to the figures which accompany the description and which are presented by way of illustration of one preferred embodiment of the invention and do not restrict the limited invention indicated in the claims.

FIG. 3 also shows a sloping wall which is lowered onto one of the support shelves.

FIG. 4*a* represents a rear view of a support device for gathering bag rollers with a sloping wall at its base.

FIG. 4*b* is a perspective view of a roller support device on which a bag rests.

Figure 5:
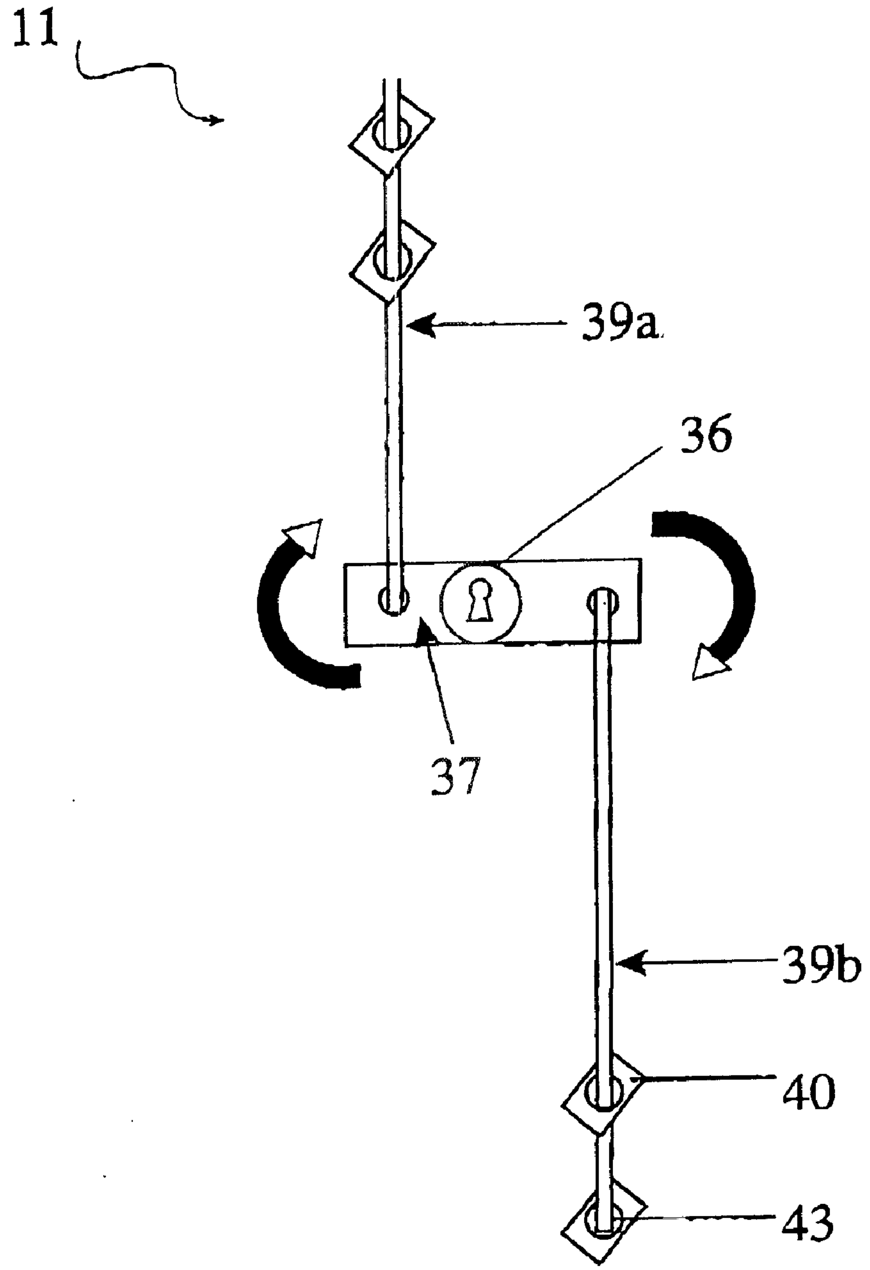

FIG. 5 is a door bolting device in a preferred embodiment of this invention.

The invention will be better understood by reading of the following detailed description.

The animal waste collection device claimed for this invention comprises a casing (1) which is more or less cubic and which has an upper wall with a profile adapted for streaming down of water, such as one with a rounded contour. The casing may be fastened to the entire support, such as the base (2).

The device further comprises a door or movable side wall (3), at least an opening (5) in one of the surfaces or at the level of the door or movable side wall for introduction of waste, at least one opening or slot (9) for removal of gathering bags (10). This opening/these openings is/are present at the level of at least one of the surfaces of the device or at the level of the door or movable wall.

In order to keep the gathering bags inside the casing, the collector comprises at least one internal support and dispensing device (12) for gathering bags, which are in a roll, for example, this device being adapted for withdrawal of bags outside the casing. In order to prevent the malicious spreading of the wastes collected inside the collector, the latter is equipped with a door bolting system (11).

In addition, the bottom wall of the casing is provided with one or more drain openings for evacuation of water in the event of cleaning or if rain or snow penetrates; this bottom wall may exhibit a profile suitable for promoting flow of water in the direction of the drainage openings.

Lastly, the collector houses a moving carriage (15) which is provided for holding a waste gathering bag (21) open and which is adapted for removal through the door of such casing by pulling.

This moving carriage exhibits a side profile more or less in the shape of an inverted letter U and is made up of an upper shelf (17) connected to a rear wall (18) and a lower shelf (19) having at least one hole (16) for drainage of liquids. In addition, the lower shelf of the moving carriage rests on means such as slide bars (24) which are positioned on the interior surface of the lower wall of the casing. These means operate in conjunction with suitable means present on the interior surface of the lower wall of the casing. The carriage also comprises means for stopping its travel outside the casing and preventing upsetting of the carriage when it is removed.

The upper shelf is provided with an opening (20) suitable preferably for holding a waste gathering bag (21) safely by clamping without tearing by a suitable clamping tightening ring.

In another embodiment of the invention the moving carriage is made up of a single upper shelf; this allows dropping of the collection bag directly into a truck once the bag has been released.

The upper shelf is provided with a folding clamping ring (23) mounted on the slab or at the level of the edge formed by the upper shelf and the rear wall of the carriage; this clamping ring has a configuration suitable for fitting at least to some extent into the opening in the shelf and holding by clamping a bag for gathering of waste collection bags.

In addition, the carriage comprises a stiffening rod (27) also serving as a gripping rod which connects the upper shelf to the lower shelf; this rod prevents the upper shelf from sagging under the weight of a bag when the latter is full.

Lastly, in order to prevent the bag from getting caught when being removed from the casing, the lower shelf of the moving carriage is provided with side edges (22). The latter delimit additional spaces for storage of reserve bags, as is to be seen in FIG. 2.

Inside the casing, a support shelf (29) is fastened to each of the interior surfaces of the side walls of the casing, preferably in a plane perpendicular to the plane of the side wall.

These shelves serve to support the upper shelf and are provided with means suitable for operating in conjunction with supplementary means present on the lower surface of the plate (17) to permit sliding and guiding of the carriage out of the casing. Such means are, for example, one or more grooves of a cross-section suitable for use in conjunction with a corresponding rib of the lower surface of the shelf and have means for stopping sliding. Such means for causing the plate to slide may be represented by all conventional general-purpose means.

In addition, inside the casing there are two sloping side walls (47) which slope downward from the surfaces of the side walls toward the gathering bag opening.

The collector also comprises at least one bag support and dispensing device (12) which is fastened at the level of the interior surface of at least one wall of the casing and/or at the level of the door, the latter at the level of a bag removal opening or slot, preferably below the support shelves. These dispensing devices serve as support bearing to receive gathering bag rollers, for example. The bags are preferably tied to each other so that, when one bag has been removed, the following one is in a good position for removal in its turn.

These dispensing devices exhibit a side profile more or less similar to a printed capital L; such devices may exhibit a width which may be equal to the width of the side wall of the casing or a width which is smaller but more or less equivalent to the width of the bags so as to ensure proper holding of these bags.

In addition, the angle between the two bars of the L is greater than 900 and smaller than or equal to 180°.

In order to prevent malicious spreading of waste collected, the collector is provided with a system for locking the door or movable side wall. This collector locking system may be represented by any conventional general-purpose bolting and locking system.

This door bolting device (11) in a preferred embodiment comprises a control bolt (36) of a plate, preferably flat and rigid (37), which is fastened so as to be free to rotate in its center on the interior surface of the door when the bolt is released.

Two closing bars **(39*a*,39*b*) are fastened on both sides of the axis of rotation of the flat and rigid plate so as to rotate freely at one of their ends. When a worker opens the door by means of a key, he causes pivoting of the plate and simultaneously a vertical upward movement of the bar (39*b*) and vertical downward movement of the bar (39*a*), this resulting in unlocking of the door. In addition, the locking system comprises guides (40) for the bars (39*a*,39*b*)** which are fastened to the interior surface of the front wall or door.

To permit passage of the upper bar **(39*a*) the upper plate has at the level of its front edge a passageway slot (41) for the bar 39*a***.

In order for the locking to be effective, the interior surface of the lower wall of the casing is provided, for example, with a slot (43) adapted to receive the free end of the locking bar **(39*b*)**, which blocks the door when it enters the slot.

Inside the casing are two sloping side walls which slope toward the opening of the gathering bag from the surfaces of the side walls. These two sloping walls are fastened so as to rotate freely between the front and rear walls of the casing so that they may be lowered and raised. The walls are provided with all conventional general-purpose means to enable their rotation about an axis (A) which is situated at the level of one of the edges of the wall (47).

The function of these walls inside the casing is to prevent used gathering bags thrown inside the casing from remaining on the shelves.

Figure 1:
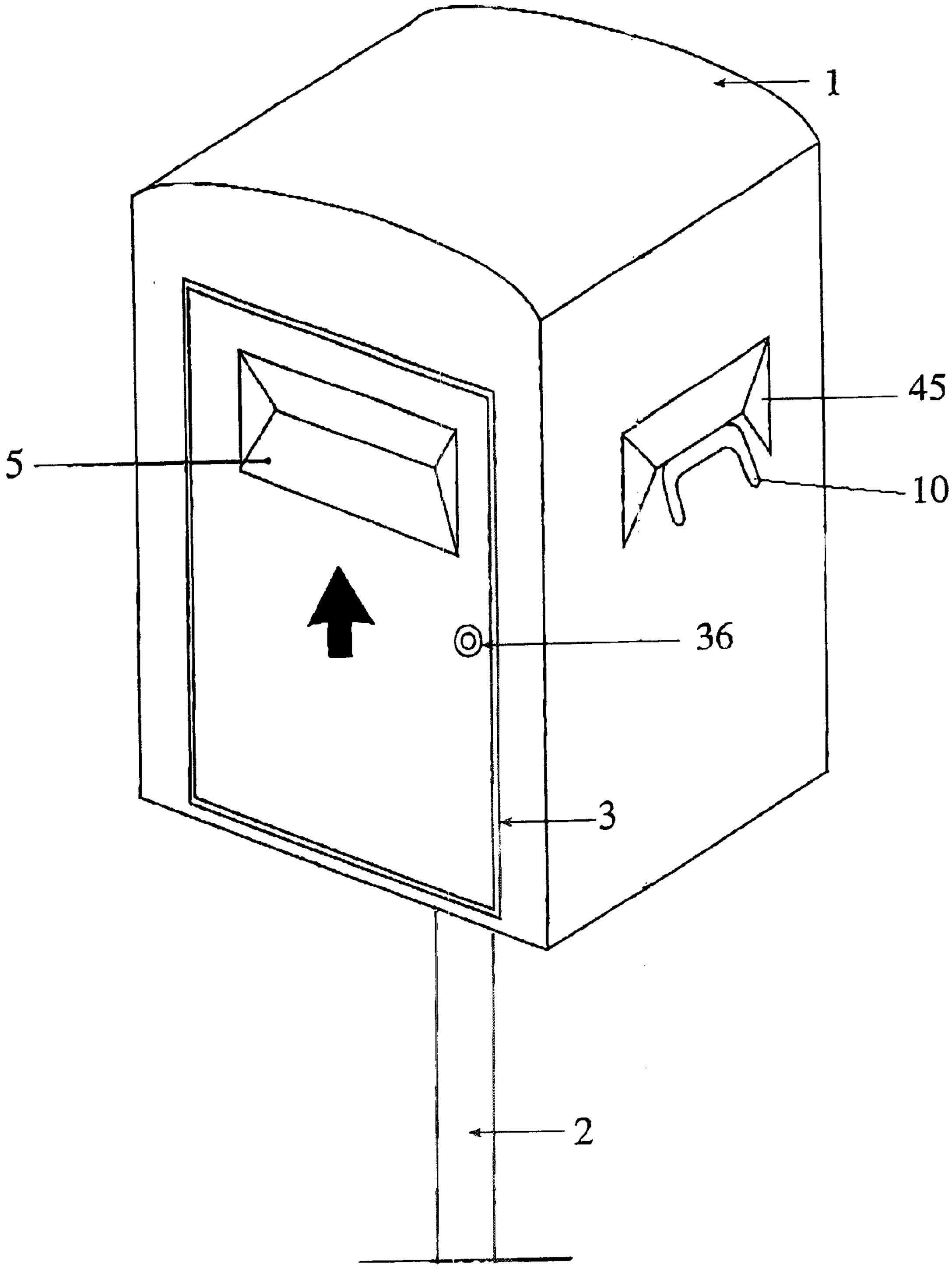
FIG. 1 is an external perspective view of an embodiment of the invention.
Figure 2:
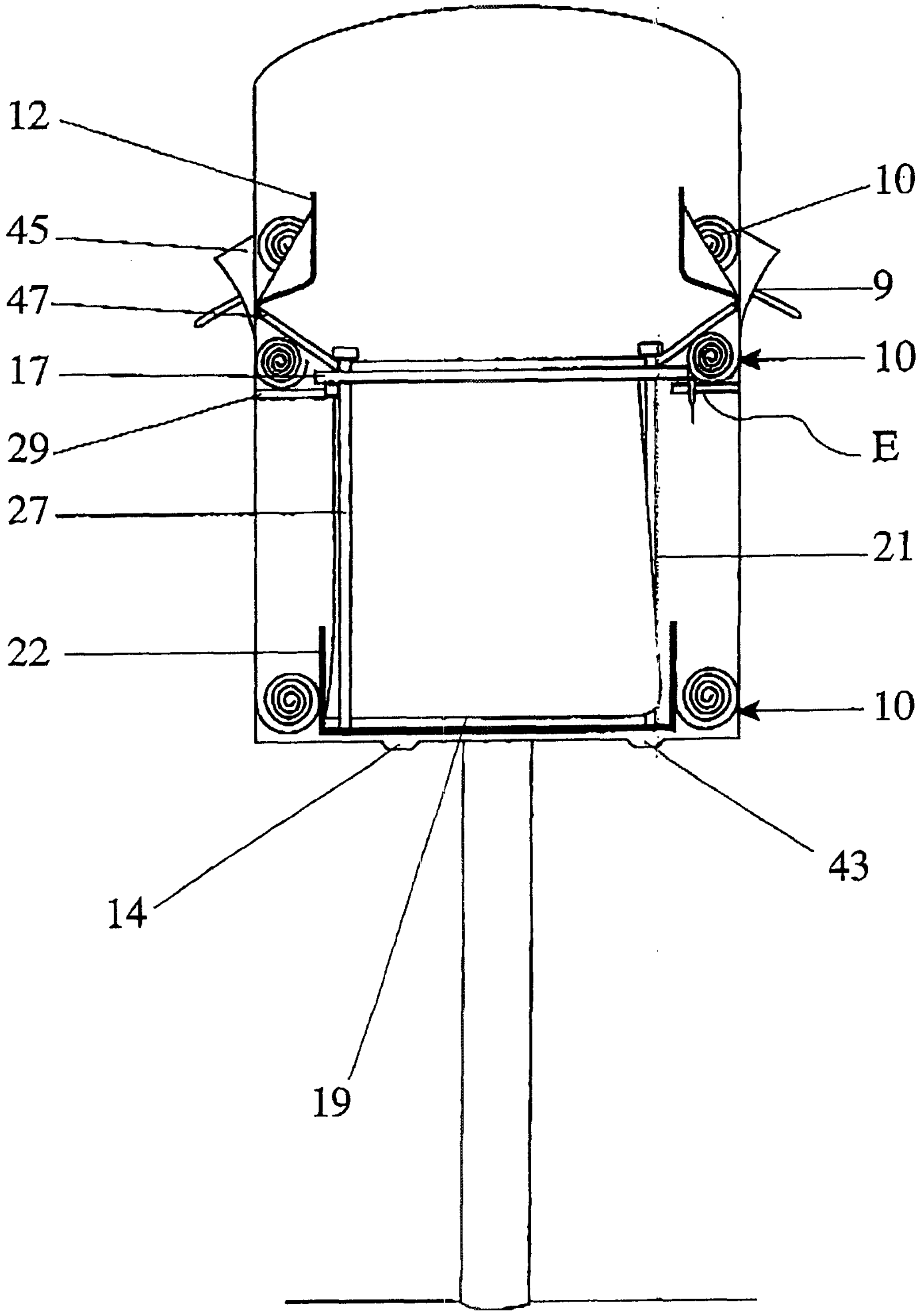
FIG. 2 is a frontal sectional view of the device in a preferred embodiment of the invention.
Figure 3:
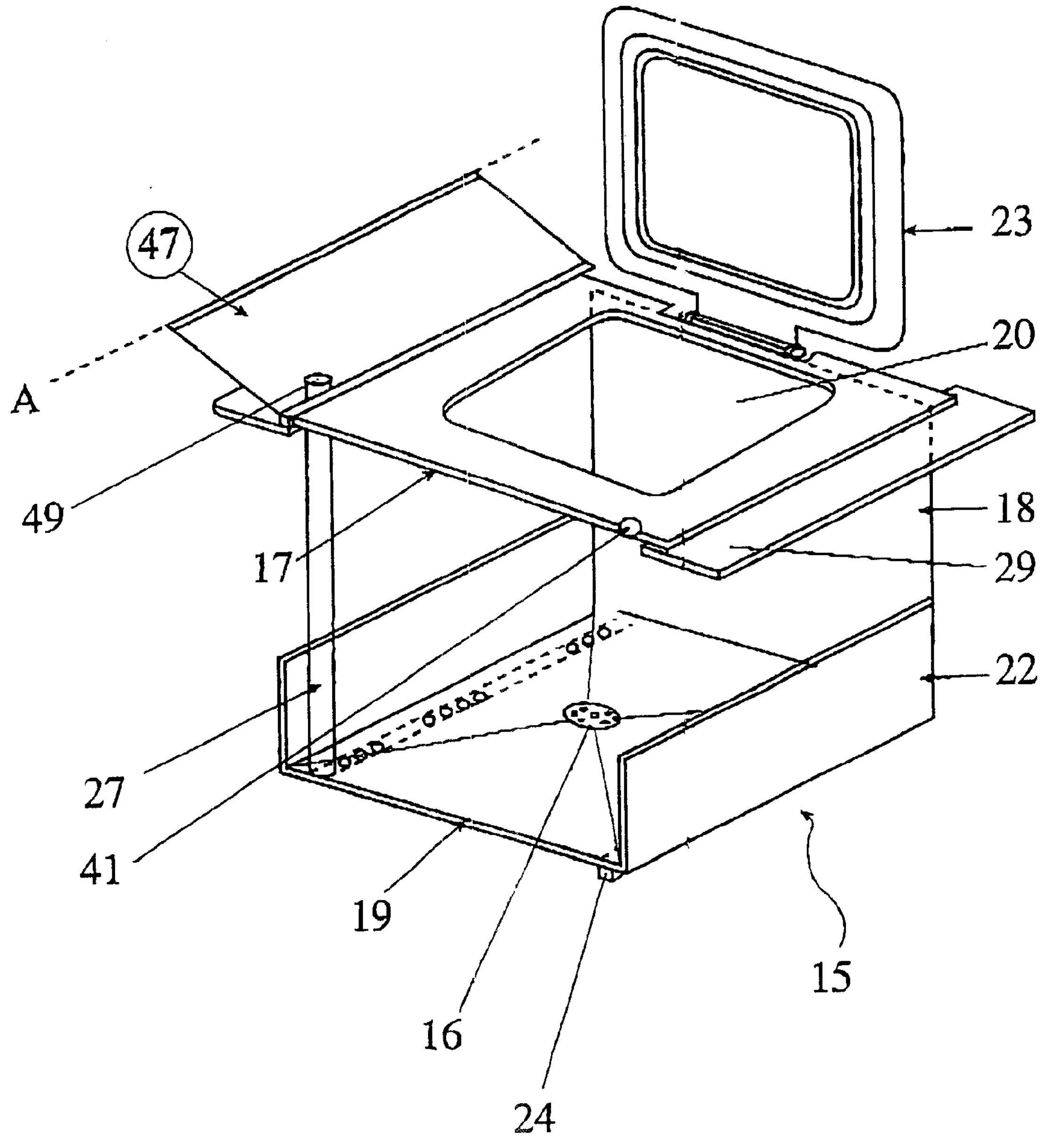
FIG. 3 is a view of the moving carriage sheltered by the casing or exterior of the device mounted on support shelves.

When lowered, the sloping walls (47) define with the support shelves and the side walls a space (E) which may serve for storage of the gathering bags, as may be seen in FIG. 2. These sloping walls may be provided with a device (49) preventing a person from taking possession of bags which may be stored in the space (E).

Lastly, to prevent water or snow from making its way inside the casing, all the openings or slots present at the level of the casing and the door are protected from water and snow by a strip (45) extending from the wall of the casing or door or movable side wall, or by an element of the canopy type mounted on the wall.

It will be seen after this detailed description of a preferred embodiment claimed for the invention that the disadvantages inherent in devices of the prior art have been eliminated. In fact, because of the single-block casing, the problems associated with; opening the compartment which holds the gathering bag in prior-art devices have been eliminated; opening the compartment remains easy in any situation. Of course, the opening or openings for introduction of waste may be present on any surface of the casing, naturally with the exception of the bottom.

Additionally, in order to remove the gathering bag, it suffices for the worker to pull on the carriage in order to cause it to roll out and then the worker has only to lift off the bag clamping ring in order to free the latter and cause it to slide into a recovery vehicle, without having to lean over the bag and without having to lift it and thus be subjected to the odor.

The device claimed for this invention may, of course, may be made of any suitable material of interest simply from the economic viewpoint, such as metal or a suitable plastic, and starting with basic elements readily available on the market.

In one specific embodiment the internal elements of the collecting device, such as the clamping ring (23), the carriage (15), the side edges (22), the support shelves (29), the sloping side walls (47), the support and dispensing device (12), and the gathering bags are made of a plastic such as high-density polyethylene, low-density polyethylene, or the like, including a fragrance.

This fragrance makes it possible to scent the interior of the collecting device, as well as the bags when removed from the device, so as to mask the nauseating order of the animal waste. The period over which the fragrance is released will depend on the type of material and the fragrance employed.

In another specific embodiment the device claimed for the invention is outfitted with an acoustic device which is activated when a user removes a bag from the collecting device. This acoustic device is powered by means with which the expert is familiar, such as a solar-powered battery or an electric outlet.

When a user removes a bag from the collecting device the acoustic device is activated and reproduces a voice which, for example, thanks the user or broadcasts an advertising slogan.

The invention also covers all embodiments and all applications immediately familiar to the expert on reading of this patent application from his own knowledge.

What is claimed is:

1. An animal waste collection device comprising a more or less cubic casing (1) fastened on a base and having an upper wall of a profile suitable for streaming down of water, characterized in that such casing comprises at least one door or movable side wall (3), at least one opening in at least one of the surfaces and/or at the level of the door for introduction of wastes into the casing, at least one opening or slot (9) for removal of bags (10) in at least one of its surfaces and/or at the level of the door, at least one internal collection bag support and dispensing device suitable for bag removal (12), a door bolting and locking device (11), at least one opening (14) in its lower wall, a moving carriage (15) suitable for holding a waste collection bag (21) and suitable for being pulled outside such casing.

2. An animal waste collection device as defined in claim 1, wherein the moving carriage has a side profile more or less in the form of an inverted U made up of an upper plate (17), a rear wall (18), and a lower plate (19).

3. An animal waste collection device as defined in claim 2, wherein the upper plate is provided with an opening (20) suitable for holding a gathering bag safely, without tearing, by clamping with a clamping ring of a suitable shape.

4. An animal waste collection device as defined in claim 3, wherein the upper plate is provided with a tilting clamping ring (23) of a shape suitable for insertion at least to some extent into the opening in the shelf and holding a collection bag (21).

5. An animal waste collection device as defined in claim 2, wherein the carriage comprises a stiffening rod (27) between the upper plate and the lower plate.

6. An animal waste collection device as defined in claim 5, wherein the lower plate is provided with side edges (22).

7. An animal waste collection device as defined in claim 1, wherein the moving carriage is made up of a single upper plate.

8. An animal waste collection device as defined in claim 1, wherein, inside the casing, there is fastened to each of the interior surfaces of the side walls of the casing a support plate (29) fastened in a plane preferably perpendicular to the plane of the side wall.

9. An animal waste collection device as defined in claim 8, wherein the support plates are provided with means suitable for operation in conjunction with supplementary means present on the lower surface of the slab (17) to cause the carriage to slide out of the casing.

10. An animal waste collection device as defined in claim 1, wherein at least one bag dispensing device (12) is mounted on the lower surface of at least one of the walls and/or of the door at the level of a bag dispensing opening or slot.

11. An animal waste collection device as defined in claim 10, wherein the bag dispensing device has a side profile more or less similar to a printed capital L.

12. An animal waste collection device as defined in claim 11, wherein the angle between the two arms of the L is greater than 90° and smaller than 180°.

13. An animal waste collection device as defined in claim 1, therein the collector locking device is represented by any conventional general-purpose door bolting device.

14. An animal waste collection device as defined in claim 1, wherein the upper plate comprises at the level of its front edge a slot (41) for passage of the closing bar **(39*a*)**.

15. An animal waste collection device as defined in claim 1, wherein the casing comprises on the interior surface of its lower wall a slot (43) suitable for receiving the free end of the closing bar **(39*a*)**.

* * * * *